F. A. HUBEL & H. H. TAYLOR.
Assignor to said F. A. HUBEL.
CAPSULE MACHINE.
No. 10,316. Reissued Apr. 17, 1883.
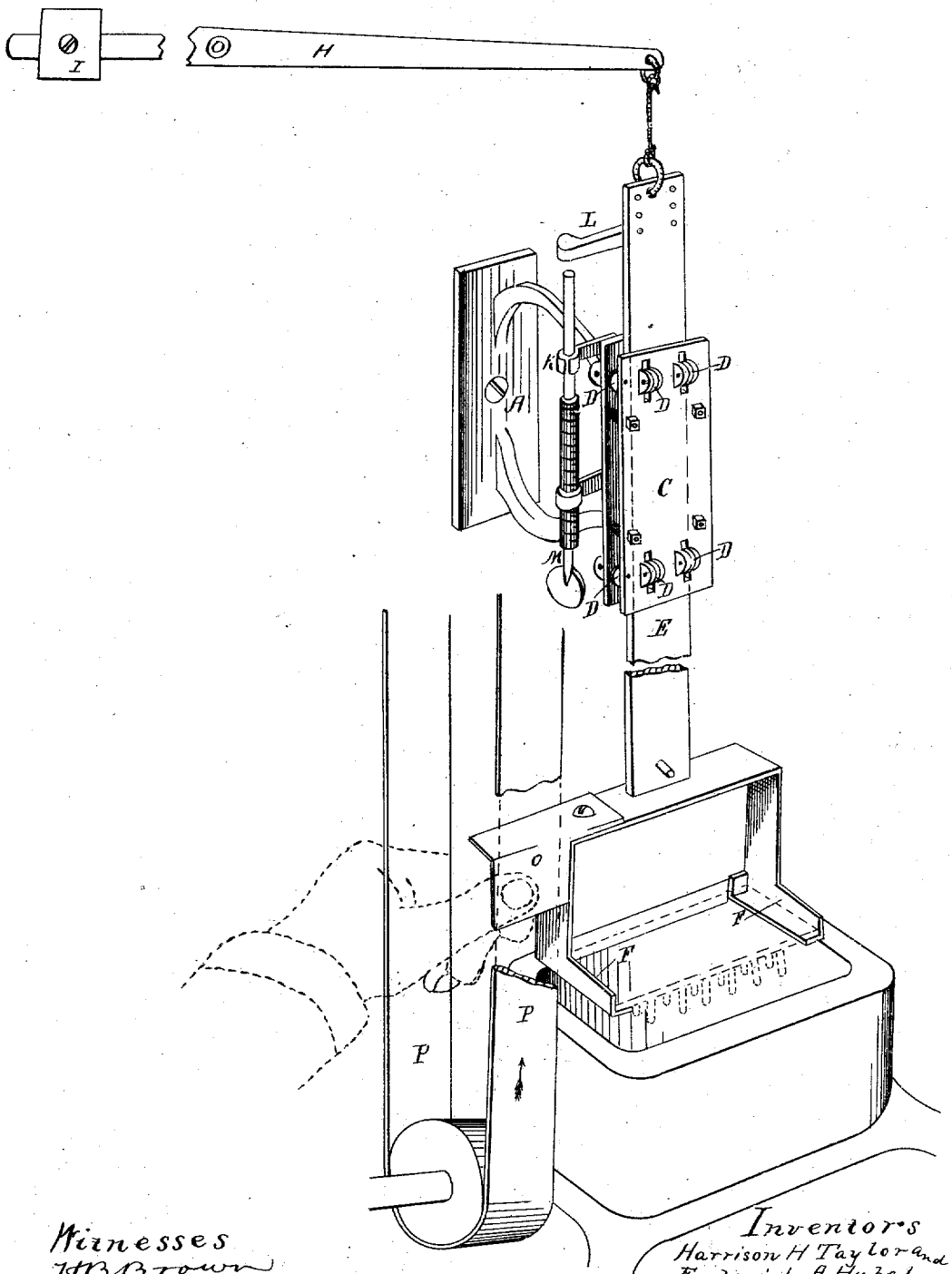
Witnesses
H. B. Brown
E. H. Bond
Inventors
Harrison H Taylor and
Frederick A Hubel
per
T. J. W. Robertson
Attorney
N. PETERS, Photo-Lithographer, Washington, D. C.

UNITED STATES PATENT OFFICE.

FREDERICK A. HUBEL AND HARRISON H. TAYLOR, OF DETROIT, MICHIGAN, ASSIGNORS TO SAID FREDERICK A. HUBEL.

CAPSULE-MACHINE.

SPECIFICATION forming part of Reissued Letters Patent No. 10,316, dated April 17, 1883.

Original No. 268,103, dated November 28, 1882. Application for reissue filed February 6, 1883.

*To all whom it may concern:*

Be it known that we, FREDERICK A. HUBEL and HARRISON H. TAYLOR, of Detroit, in the county of Wayne and State of Michigan, have invented new and useful Improvements in Devices for Immersing Capsule-Molds; and we do hereby declare that the following is a full, clear, and exact description thereof, reference being had to the accompanying drawing, which forms a part of this specification.

The nature of this invention relates to certain new and useful improvements in the construction of a device for immersing capsule-molds in a gelatine solution and removing the same therefrom.

The invention consists in the peculiar construction and operation of the device, as more fully hereinafter described.

In the accompanying drawing, wherein our invention is shown in perspective, A represents a bracket, designed to be secured in a vertical position to any suitable support, and this bracket supports a two-part slide, C, the front and rear and both sides of this slide being provided with friction wheels or bearings D. Between the front and rear walls of this slide, and between the wheels, the smooth plate-bar E has a vertical motion. The lower end of this bar terminates in two flanged jaws, F, upon the flanges of which, with the mold-pins projecting downwardly, is placed a plate of molds substantially such as is described in F. A. Hubel's Reissued Patent No. 8,440. The upper end of this bar is connected by a rope, chain, or wire to a lever, H, suitably fulcrumed above the device, and the opposite end of this lever is provided with a counter-balance, I, of sufficient weight to balance the bar and its attachments and plate of molds in place.

Projecting from one side of the slide, and rigidly secured thereto, is a nut, J, and a hollow guide, K. Projecting from the bar, and rigidly secured thereto, is a stop, L, the nut, guide, and stop all being in line with each other. The thumb-screw M, the upper end of which is turned off smoothly, is engaged with the nut and guide to regulate the depth of the immersion of the mold-pins in the gelatine solution L. The receptacle for such gelatine solution being full and the device described supported immediately above it, the set-screw is run up a sufficient distance, so that when the bar carrying the molds is run down until the stop upon the bar impinges against the top of the thumb-screw the molds will have been dipped in the solution to the proper depth. As one plate of molds after another is thus immersed and removed the solution gradually lowers in the receptacle, and as gradually the thumb-screw is turned down to allow the bar to drop a little farther, and so on until the solution has been so nearly used up as to require that its receptacle shall be replenished.

As it is essential that the molds after immersion should be quite slowly withdrawn at a regular speed from such immersion, we provide the following means for accomplishing this purpose: We attach to one side of the jaw-frame of the bar a flat plate, O, in front of which and in close proximity but not in contact therewith runs a belt, P, driven by any proper power. This belt runs at a very slow uniform rate of speed, and after the plate of molds has been immersed the belt is brought in contact with the face of the plate O by means of the hand or any suitable tightener; and this contact is preserved until the points of the mold are withdrawn from the solution, when such plate is removed and a fresh one substituted and the operation repeated.

What we claim as our invention is—

1. A device for dipping capsule-molds, consisting of a vertically-movable carrier adapted to hold the molds, and mechanism traveling at a prescribed rate of speed and adapted to be temporarily connected with and raise said carrier, substantially as described.

2. In a device for dipping capsule-molds, the combination, with a suitable vessel for containing the fluid gelatine, of a vertically-moved carrier, to which the molds are attached, a bar or frame for suspending the same, and an adjustable stop for limiting the downward movement thereof, and a vertically-moving belt adapted to be temporarily connected to the said carrier-frame for imparting a steady upward movement thereto, substantially as described.

3. In a machine for dipping capsule-molds, the combination, with the carrier F and suitable means for lowering the same, of the traveling belt P and means, substantially as described, for temporarily connecting the carrier to the belt, as set forth.

4. In a machine for dipping capsule-molds, the combination, with the carrier F, having a projecting plate, O, of the belt P, for engaging with said plate for raising the carrier at a uniform speed, and the counterbalance-lever H and connection between the said lever and carrier, substantially as and for the purpose specified.

5. In a device for dipping capsule-molds, the carrier F, in combination with the bar E, having a stop, L, the guide C, the adjusting-screw M, and means for raising and lowering said carrier and bar, substantially as described.

6. In a device for dipping capsule-molds, the combination, with the carrier F, the bracket A, arm J, guide K, screw M, guides C, and rollers D, of the carrier F, having a plate, O, the belt P, the bar E, having stop L, and the lever H, substantially as and for the purpose specified.

FREDERICK A. HUBEL.
HARRISON H. TAYLOR.

Witnesses:
H. S. SPRAGUE,
E. SCULLY.